(12) United States Patent
Jin et al.

(10) Patent No.: US 12,491,155 B2
(45) Date of Patent: Dec. 9, 2025

(54) METHOD FOR PRODUCING ORAL DISINTEGRATING FILM COMPRISING POORLY SOLUBLE DRUG

(71) Applicant: AJOU UNIVERSITY INDUSTRY-ACADEMIC COOPERATION FOUNDATION, Gyeonggi-do (KR)

(72) Inventors: Hyo Eon Jin, Gyeonggi-do (KR); Hui Won Cho, Gyeonggi-do (KR)

(73) Assignee: AJOU UNIVERSITY INDUSTRY-ACADEMIC COOPERATION FOUNDATION, Gyeonggi-do (KR)

(*) Notice: Subject to any disclaimer, the term of this patent is extended or adjusted under 35 U.S.C. 154(b) by 0 days.

(21) Appl. No.: 17/515,372

(22) Filed: Oct. 29, 2021

(65) Prior Publication Data

US 2022/0133624 A1    May 5, 2022

(30) Foreign Application Priority Data

Nov. 2, 2020  (KR) .......................... 10-2020-0144655

(51) Int. Cl.

| | | |
|---|---|---|
| *A61K 9/00* | (2006.01) |
| *A61K 31/216* | (2006.01) |
| *A61K 31/277* | (2006.01) |
| *A61K 31/397* | (2006.01) |
| *A61K 31/404* | (2006.01) |
| *A61K 31/4045* | (2006.01) |
| *A61K 31/451* | (2006.01) |
| *A61K 31/4515* | (2006.01) |
| *A61K 31/55* | (2006.01) |
| *A61K 31/5513* | (2006.01) |
| *A61K 31/64* | (2006.01) |
| *A61K 47/10* | (2017.01) |
| *A61K 47/32* | (2006.01) |
| *A61K 47/34* | (2017.01) |

(52) U.S. Cl.
CPC ............ *A61K 9/006* (2013.01); *A61K 31/216* (2013.01); *A61K 31/277* (2013.01); *A61K 31/397* (2013.01); *A61K 31/404* (2013.01); *A61K 31/4045* (2013.01); *A61K 31/451* (2013.01); *A61K 31/4515* (2013.01); *A61K 31/55* (2013.01); *A61K 31/5513* (2013.01); *A61K 31/64* (2013.01); *A61K 47/10* (2013.01); *A61K 47/32* (2013.01); *A61K 47/34* (2013.01)

(58) Field of Classification Search
CPC .... A61K 9/006; A61K 31/216; A61K 31/277; A61K 31/397; A61K 31/404; A61K 31/4045; A61K 31/451; A61K 31/4515; A61K 31/55; A61K 31/5513; A61K 31/64; A61K 47/10; A61K 47/32; A61K 47/34; A61K 9/0056; A61K 47/26; A61K 47/36; B29C 64/106; B29C 64/118; B33Y 70/10; B33Y 80/00; B33Y 10/00; B33Y 70/00; A61P 25/18

See application file for complete search history.

(56) References Cited

U.S. PATENT DOCUMENTS

| | | | | |
|---|---|---|---|---|
| 7,825,125 | B2 * | 11/2010 | Stritzke ................ | A61K 9/2077 |
| | | | | 514/253.07 |
| 2016/0303038 | A1 * | 10/2016 | Yadav .................... | A61K 47/36 |

FOREIGN PATENT DOCUMENTS

| | | | |
|---|---|---|---|
| JP | 2009-501752 A | 1/2009 | |
| WO | WO-2019136308 A1 * | 7/2019 | ............. A61K 31/00 |

OTHER PUBLICATIONS

Censi, Hot Melt Extrusion: Highlighting Physiochemical Factors to Be Investigated While Designing and Optimizing a Hot Melt Extrusion Process, Pharmaceutics. Published Jul. 11, 2018. (Year: 2018).*
UnitConverters.net, Convert psi to kpa. Retrieved from the Internet on Jan. 17, 2023, https://www.unitconverters.net/pressure/psi-to-kpa.htm. (Year: 2023).*
Pratik et al. A brief review on Kollidon. Journal of Drug Delivery and Therapeutics, 9(2):493-500. Published 2019. (Year: 2019).*
Byung-Cheol Oh et al., "Preparation and evaluation of identifiable quick response (QR)-coded orodispersible films using 3D printer with directly feeding nozzlevirtual screening", International Journal of Pharmaceutics 584 (2020) 119405.
Witold Jamróz et al, "3D printed orodispersible films with Aripiprazole", International Journal of Pharmaceutics 533 (2017) 413-420.
Eon Soo Song et al., "Fabrication of Theophylline-loaded Sustained Release Tablet via Coupling of Hot Melt Extrusion and 3D Printing", IEEE Journal of Solid-State Circuits, vol. 54, No. 8, Aug. 2019, Abstact Only.
Noehyun Myung et al., "Construction of Programmable Drug Delivery System with Additive Manufacturing", ISSN 0377-9556 (Print) ISSN 2383-9457 (Online) Yakhak Hoeji vol. 63, No. 5, 2019, Abstract Only.
Alice Melocchi et al., "Hot-melt extruded filaments based on pharmaceutical grade polymers for 3D printing by fused deposition modeling", International Journal of Pharmaceutics vol. 509, Issues 1-2, Jul. 25, 2016, pp. 255-263.
Hui-Won Cho et al., "Orodispersible Polymer Films with the Poorly Water-Soluble Drug, Olanzapine: Hot-Melt Pneumatic Extrusion for Single-Process 3D Printing", Jul. 22, 2020.

* cited by examiner

*Primary Examiner* — James H Alstrum-Acevedo
*Assistant Examiner* — Lauren Wells
(74) *Attorney, Agent, or Firm* — Tarolli, Sundheim, Covell & Tummino LLP

(57) ABSTRACT

A method for producing an oral disintegrating film including a poorly soluble drug is provided, the method includes the steps of producing a mixture by melting a film-forming polymer, a solubilizer, and a poorly soluble drug, and printing the melted mixture by a 3D printing technique.

11 Claims, 11 Drawing Sheets

METHOD FOR PRODUCING ORAL DISINTEGRATING FILM COMPRISING POORLY SOLUBLE DRUG

CROSS-REFERENCE TO RELATED APPLICATION

This application claims priority to and the benefit of Korean Patent Application No. 2020-0144655, filed on Nov. 2, 2020, the disclosure of which is incorporated herein by reference in its entirety.

BACKGROUND

1. Field of the Invention

The present disclosure discloses a method for producing an oral disintegrating film comprising a poorly soluble drug and an oral disintegrating film produced by the method, and more specifically, to an oral disintegrating film which is easily treated and taken because the dissolution and disintegrating rate of the drug are fast and its portability is good in spite of comprising a poorly soluble drug.

2. Discussion of Related Art

Olanzapine is a drug whose IUPAC name is 2-methyl-4-(4-methyl-1-piperazinyl)-10H-thieno[2,3-b] [1,5]benzodiazepine, and is an unusual antipsychotic drug used to treat schizophrenia and many mental health disorders due to its few side effects and high efficiency. However, although drugs corresponding to Class II in the Biopharmaceutics Classification System, such as olanzapine, account for 50% or more of pharmaceuticals, its utilization is not easy because oral bioavailability is reduced due to the low solubility of the ingredients. Olanzapine is produced using a lyophilization method to increase the rate of decomposition, and is in a fragile form that causes many problems in a process procedure because it has to go through a multi-step process of making, storing, processing and managing a dosage form.

Therefore, studies for improving the solubility of drugs belonging to Class II in the Biopharmaceutics Classification System have been actively conducted. Although many methods such as a solvent-casting method and a hot-melt extrusion method have been attempted for this purpose; the solvent-casting method has an inherent problem in that air bubbles are present along with high inter-batch variability and a residual solvent of a film. The hot-melt extrusion method has advantages in that there is no requirement for compressibility of a mixture including an active ingredient and the active ingredient can be solid-dispersed in another hydrophilic polymer composition to improve the solubility and solubilization rate. However, the hot-melt extrusion method has a limitation of requiring a multi-step process of producing a filament. This multi-step process includes using a rotary screw during the hot-melt extrusion step to mix and heat a composition and then manufacturing an object by melting the prepared filament and extruding the filament (International Journal of Pharmaceutics Volume 509, Issues 1-2, 25 Jul. 2016, Pages 255-263).

Therefore, there is a need for a novel method of producing a highly soluble film including a poorly soluble drug, such as olanzapine, that has a low production cost and does not require the intermediate step of the aforementioned hot-melt extrusion process.

SUMMARY OF THE INVENTION

As a result of conducting studies to solve the existing problems, remove an intermediate step of the process, and produce a stable film, the present inventors confirmed that it was possible to produce an oral disintegrating film having a stable form and comprising a drug in the form of an amorphous solid dispersion by simplifying the production process through a 3D printing method which utilizes hot-melt pneumatic extrusion, thereby completing the present disclosure.

Thus, an object of the present disclosure is to provide a method for producing an oral disintegrating film comprising a poorly soluble drug, the method including the following steps:

a) producing a mixture by melting a film-forming polymer, a solubilizer, and a poorly soluble drug; and b) printing the melted mixture by a 3D printing technique.

Further, another object of the present disclosure is to provide an oral disintegrating film produced by the production method.

However, technical problems to be solved by the present disclosure are not limited to the aforementioned problems, and other problems that are not mentioned may be clearly understood by the person skilled in the art from the following description.

To achieve the aforementioned objects, the present disclosure provides a method for producing an oral disintegrating film comprising a poorly soluble drug, the method including the following steps:

a) producing a mixture by melting a film-forming polymer, a solubilizer, and a poorly soluble drug; and b) printing the melted mixture by a 3D printing technique.

As an exemplary embodiment of the present disclosure, the printing may be performed by spraying at a pneumatic pressure of 350 kPa to 600 kPa.

As another exemplary embodiment of the present disclosure, the printing may be performed at a temperature of 150° C. to 170° C.

As still another exemplary embodiment of the present disclosure, the poorly soluble drug may be one or more selected from the group consisting of haloperidol, glibenclamide, bicalutamid, ezetimibe, aceclofenac, carbamazepine, indapamide, and olanzapine.

As yet another exemplary embodiment of the present disclosure, the film-forming polymer may be one or more selected from the group consisting of pullulan, gelatin, pectin, hydroxyethyl cellulose, carboxymethyl cellulose, polyvinyl alcohol, polyacrylic acid, a carboxyvinyl polymer, polyethylene glycol, methylcellulose, polyvinylpyrrolidone, maltodextrin, carrageenan, modified starch, casein, whey protein isolate (WPI), soy protein isolate, gluten, acacia gum, gum arabic, guar gum, locust bean gum, xanthan gum, gellan gum, agar, and polyethylene oxide.

As yet another exemplary embodiment of the present disclosure, the solubilizer may be included in an amount of 20 wt %.

As yet another exemplary embodiment of the present disclosure, the solubilizer may be Kollidon VA64.

As yet another exemplary embodiment of the present disclosure, a plasticizer may be further added to the mixture.

As yet another exemplary embodiment of the present disclosure, the plasticizer may be poloxamer 407 or poloxamer 188.

As yet another exemplary embodiment of the present disclosure, the plasticizer may be included in an amount of 5 wt %.

As yet another exemplary embodiment of the present disclosure, the oral disintegrating film may include the poorly soluble drug in the form of an amorphous solid dispersion.

In addition, the present disclosure provides an oral disintegrating film produced by the production method.

As yet another exemplary embodiment of the present disclosure, the oral disintegrating film may have a tensile strength of 13 N to 18 N.

As yet another exemplary embodiment of the present disclosure, the oral disintegrating film may have a drug content uniformity of 94% to 100%.

As yet another exemplary embodiment of the present disclosure, the oral disintegrating film may have a disintegration time of 14 seconds to 24 seconds.

As yet another exemplary embodiment of the present disclosure, the oral disintegrating film may include the poorly soluble drug in the form of an amorphous solid dispersion.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

As a result of conducting studies to simplify a process by removing an intermediate step of the process and process a more stable film, the present inventors confirmed that it was possible to produce an oral disintegrating film having a stable form and comprising a drug in the form of an amorphous solid dispersion by a method of simplifying the production process through a 3D printing method which utilizes hot-melt pneumatic extrusion, thereby completing the present disclosure.

Thus, the present disclosure provides a method for producing an oral disintegrating film comprising a poorly soluble drug, the method comprising the following steps:
a) producing a mixture by melting a film-forming polymer, a solubilizer, and a poorly soluble drug; and
b) printing the melted mixture by a 3D printing technique.

In the present disclosure, the film-forming polymer may be a water-soluble polymer, and may be mixed with a drug and then produced as a film to play a role in rapid decomposition in the oral cavity and an increase in water solubility. The type of polymer is not limited to, but may be pullulan, gelatin, pectin, hydroxyethyl cellulose, carboxymethyl cellulose, polyvinyl alcohol, polyacrylic acid, a carboxyvinyl polymer, polyethylene glycol, methylcellulose, polyvinylpyrrolidone, maltodextrin, carrageenan, modified starch, casein, whey protein isolate (WPI), soy protein isolate, gluten, acacia gum, gum arabic, guar gum, locust bean gum, xanthan gum, gellan gum, agar, or polyethylene oxide, and preferably polyethylene oxide.

In the present disclosure, the solubilizer is a polymer widely used in the hot-melt extrusion method, and may be, but is not limited to, Kollidon VA640 (vinylpyrrolidone-vinylacetate copolymer) (Kollidon VA64). When the solubilizer is present in an amount of 20 wt %, a suitable form of film with no cracks or holes in the surface may be produced.

In the present disclosure, a plasticizer may be further added to the mixture, and the plasticizer includes materials capable of increasing the solubility of a poorly soluble drug without affecting the morphology and physical properties of a film, and may be, but is not limited to, poloxamer 407 or poloxamer 188, which is a nonionic triblock copolymer, and may be included in an amount of 5 wt % in the film for the production of a preferred film.

In the present disclosure, the drug may be a poorly soluble drug corresponding to Class II in the Biopharmaceutics Classification System, and the type thereof may be, but is not limited to, haloperidol, glibenclamide, bicalutamid, ezetimibe, aceclofenac, carbamazepine, indapamide, or olanzapine.

The hot-melt pneumatic extrusion is another form of the existing hot-melt extrusion, and may laminate and produce a drug by a method of directly loading a mixed powder into a barrel and melting the mixed powder, and then directly extruding the melt, and in this case, the hot-melt pneumatic extrusion may be performed at a pneumatic pressure of 350 to 600 kPa, preferably 400 to 550 kPa, and more preferably 450 to 500 kPa and a temperature during spraying of 150° C. to 170° C., preferably 160° C.

During the printing, 5 g or less of a mixture may be used depending on the characteristics of the barrel used. A total weight of an oral disintegrating film produced by this method may be 100 mg, the active ingredient may be 5% of the total weight of the film, and the film may have an area of 20×25 mm.

The oral disintegrating film of the present disclosure produced by the hot-melt pneumatic extrusion may have a tensile strength of 13 N to 18 N, preferably 14.1 N to 16.2 N, may have a drug content uniformity of 94% to 100%, preferably 95.5% to 100%, and may have a disintegration time of 14 seconds to 24 seconds, preferably 15.3 seconds to 23.2 seconds.

In the present disclosure, the poorly soluble drug comprised in the oral disintegration film may be an amorphous solid dispersion, and the term "amorphous solid dispersion" of the present disclosure refers to a state in which the solubility in water is about 10 to 1600-fold higher than that of the crystalline form because the crystallinity of the drug is lost, and when the poorly soluble drug is in the form of an amorphous solid dispersion, the bioavailability of the drug may be remarkably increased.

The 3D printing method of the hot-melt pneumatic extrusion is a simplified process and has excellent productivity, and an oral disintegrating film produced by the production method of the present disclosure may be usefully used for the treatment of mental health disorders because the drug is conveniently taken due to no need of being taken together with water while the film has physical properties good for portability, such as a small size.

In the present disclosure, through specific exemplary embodiments, characteristics of the production method and the oral disintegrating film produced by the production method were confirmed.

In an exemplary embodiment of the present disclosure, the composition of F3 comprising olanzapine, which is the most suitable mixture for producing oral disintegrating films (ODFs) using the production method of the present disclosure, was confirmed, and as a result of producing ODFs having composition ratios of F5 and F6 further comprising a plasticizer based on such a composition of F3, it was confirmed that F5 and F6 are suitable for producing ODFs because there are no holes or cracks in the film (see Example 3).

In another exemplary embodiment of the present disclosure, in order to confirm whether ODFs having composition ratios of F3, F5, and F6 produced by the aforementioned method actually have characteristics suitable for the oral disintegrating film, through the tensile strength (see Example 4), drug content uniformity (see Example 5), film disintegration rate (see Example 6), solid state of the drug (see Example 7), and film solubility (see Example 8), it was confirmed that when an oral disintegrating film was produced from a mixture powder having a composition of F3, F5, and F6 discovered in the present disclosure utilizing the production method of the present disclosure (3D printing using a hot-melt pneumatic extrusion method), the degree of utilization of the poorly soluble drug could be significantly enhanced.

In still another exemplary embodiment of the present disclosure, in order to confirm whether the aforementioned effects are exhibited even in the case of poorly soluble drugs other than olanzapine, as a result of producing an oral disintegrating film having a composition ratio of F7 to F9, in which olanzapine was replaced with a poorly soluble drug haloperidol, glibenclamide, or indapamide, and confirming the degree of drug release, it was confirmed that by confirming that poorly soluble drugs other than olanzapine also have excellent drug release rates, the oral disintegrating film produced using the production method of the present disclosure could also be universally utilized for other poorly soluble drugs without being restricted to olanzapine (see Example 9).

Hereinafter, preferred examples for helping the understanding of the present disclosure will be suggested. However, the following examples are provided only to more easily understand the present disclosure, and the contents of the present disclosure are not limited by the following examples.

EXAMPLES

Example 1. Reagents and Production Mechanism 1-1. Reagents

Olanzapine, a product provided by Dong-A Pharm Co., Ltd. (Gyeonggi, Korea), was used. Polyethylene oxide (POLYOX WSR N10 LEO) was purchased from Colorcon Ltd. (Dartford, UK) and used. Poloxamer 188 (Kolliphor P188) was donated by BASF (Ludwigshafen, Germany) and used. Analytical grade reagents were used as the remaining reagents except for the above reagents.

1-2. Design of 3D Printing Film

A 3D model was designed using Autodesk Fusion 360 software (ver. 2.0.7813, Autodesk, Inc., San Rafael, CA, USA), and for compatibility with a 3D printer (ROKIT INVIVO Corp., Seoul, Korea), a 3D structure file was converted into G-Code and used for slicer settings through NewCreatorK software (ver.1.57.76, ROKITTINVIVO Corp., Seoul, Korea). Many parameters were selected to obtain high-quality printlets (3D printed tablets, printlets) and optimized for the production method of the present disclosure, and the results are shown in Table 1 below.

TABLE 1

| Slicer Settings | Set Values and Type |
|---|---|
| Printing speed (mm/s) | 4 |
| Moving speed (mm/s) | 6 |
| Infill pattern | Line |
| Filling density (%) | 100 |
| Print bed temperature (° C.) | 35 |

1-3. Hot-Melt Pneumatic Extrusion (HMPE)

Figure 1:
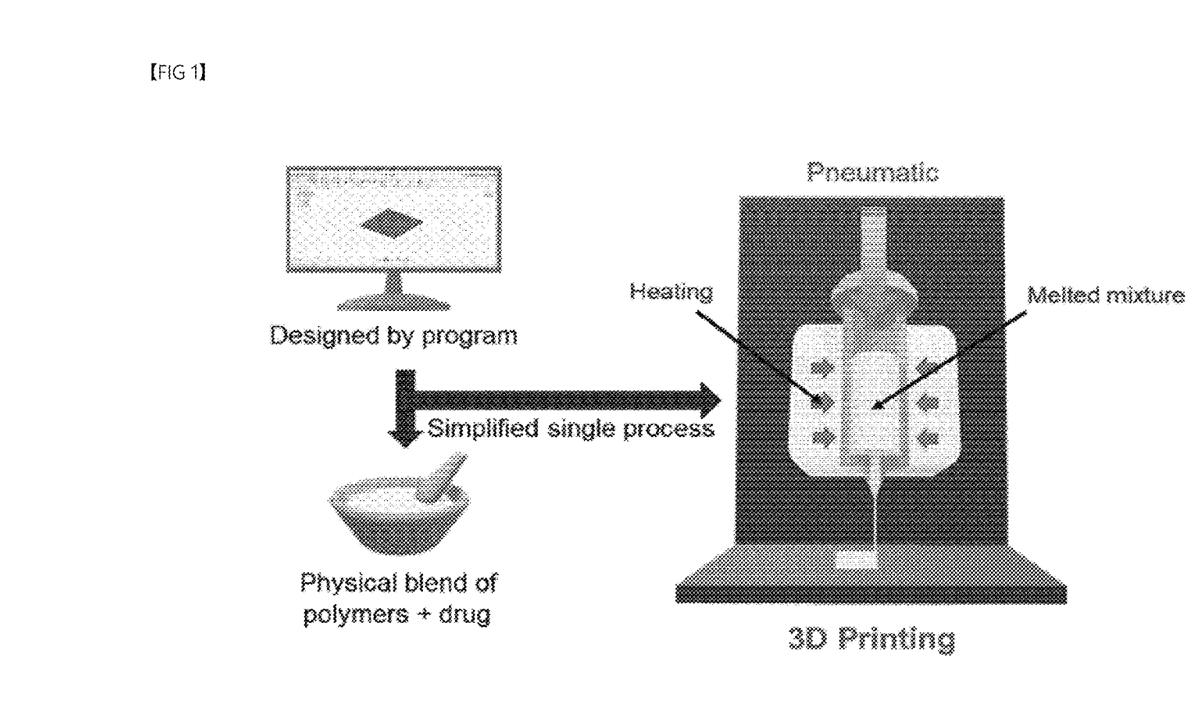
FIG. 1 is a schematic view expressing a 3D printing method that utilizes a hot-melt pneumatic extrusion method.
Figure 2:
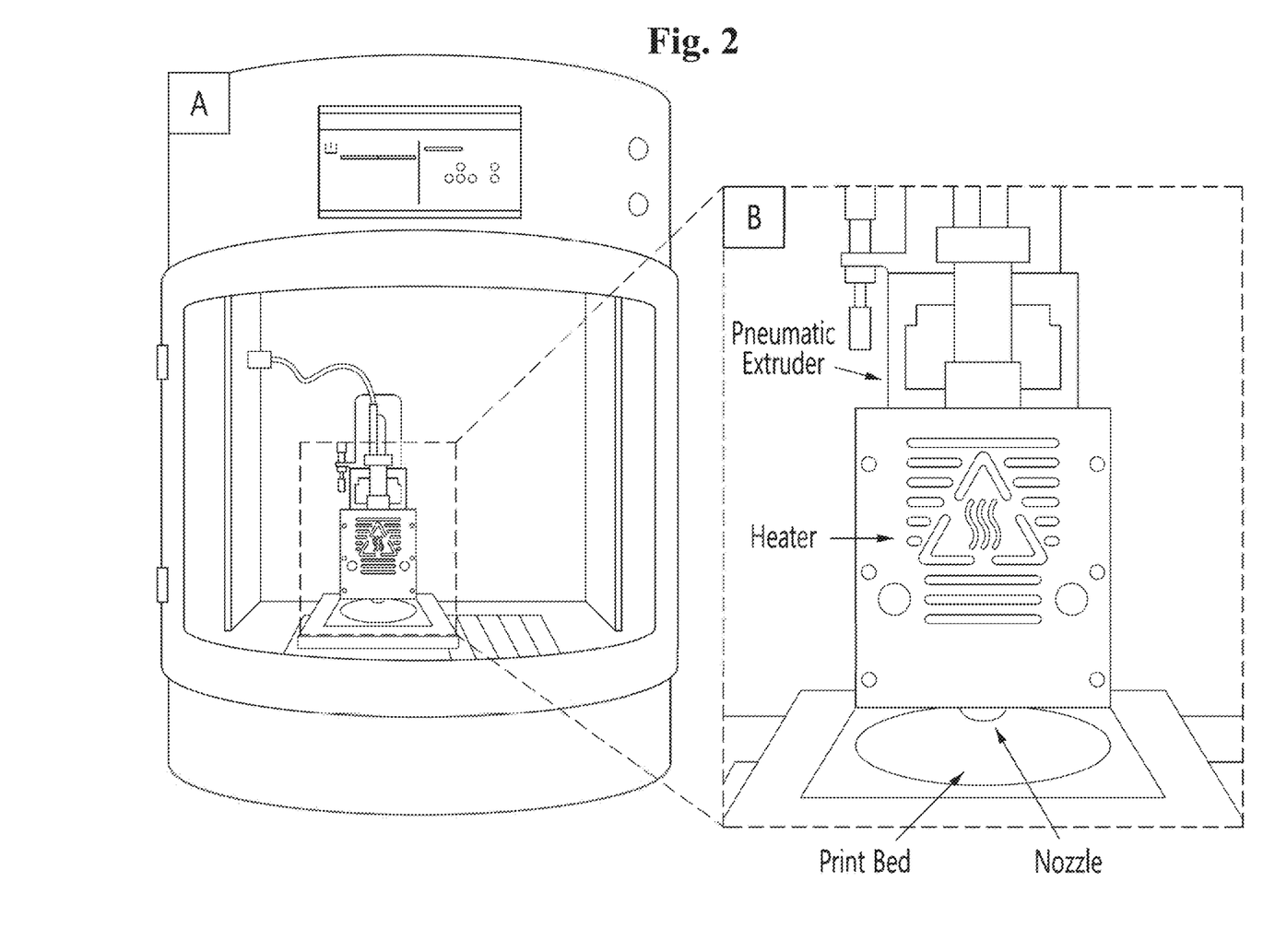
FIG. 2 illustrates the structure of a 3D printer.

The 3D printing by the hot-melt pneumatic extrusion method of the present disclosure undergoes processes of i) designing through a program, ii) mixing of a polymer and a drug, and ii) hot-melt pneumatic extrusion as illustrated in FIG. 1. Polymer carriers including various proportions were weighed and then mixed using a mortar and pestle blender (Samhwa Ceramic Co., Seoul, Korea), and further mixed using a blender. 5 g of each mixture was prepared, charged into a printing barrel, and heated. As illustrated in FIG. 2A, a 3D printer comprising HMPE has a pneumatic extruder, a heater, a print bed, and a nozzle having a diameter of 0.4 mm as illustrated in FIG. 2B, and printlets having various proportions of polymer carrier matrices may be printed. The print bed of the printer moves to print orodispersible films (ODFs). The main parameters such as pneumatic pressure and temperature are also optimized for printing, and it was confirmed that the case where 3D printing was performed at 160° C. while optimizing the temperature starting from 100° C. and increasing the temperature by 5 to 10° C. was optimal, and an optimal pneumatic pressure was found while increasing the pneumatic pressure by 50 kPa starting from 200 kPa. In this case, it was confirmed that a pneumatic pressure of 450 kPa to 500 kPa was suitable for all dosage forms.

Example 2: Production of Oral Disintegrating Film

Figure 3:
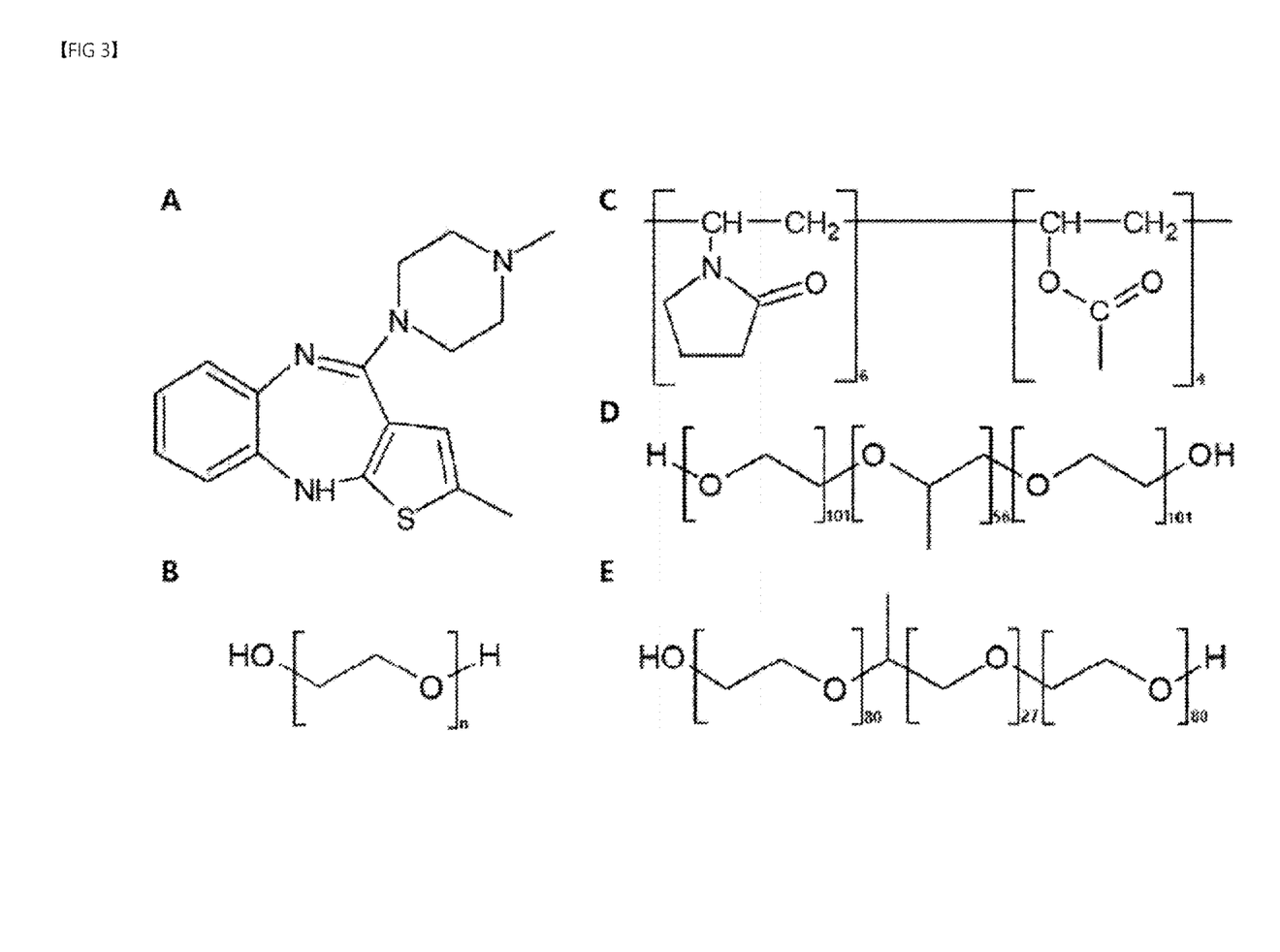
FIG. 3 is the structure of a polymer which is a component of an oral disintegrating film comprising olanzapine of the present disclosure, illustrating (A) olanzapine (OLZ), (B) polyethylene oxide (PEO), (C) Kollidon VA64 (PVPVA64), (D) poloxamer 407 (P407), and (E) poloxamer 188 (P188)

To find a film having conditions suitable for use as an oral disintegrating film, the content of the oral disintegrating film was adjusted using (A) olanzapine (OLZ), (B) polyethylene oxide (PEO), (C) Kollidon VA64 (PVPVA64), (D) poloxamer 407 (P407), and (E) poloxamer 188 (P188), which have the forms of chemical formulas illustrated in FIG. 3, and before ODFs comprising the drug were actually produced, a placebo sample of the present disclosure was prepared by mixing ingredients under the conditions shown in Table 2. Placebo samples (P1 to P6) are mixtures for establishing the composition of a preparation and are placebo samples that do not comprise an active drug.

TABLE 2

|  | P1 | P2 | P3 | P4 | P5 | P6 |
|---|---|---|---|---|---|---|
| Olanzapine (OLZ) (% w/w) | — | — | — | — | — | — |
| Polyethylene oxide N10 (PEO) (% w/w) | 100 | 90 | 80 | 70 | 60 | 50 |
| Kollidon VA64 (PVPVA64) (% w/w) | — | 10 | 20 | 30 | 40 | 50 |

In order to produce an appropriate oral disintegrating film, a material extruded by a 3D printing method of hot-melt pneumatic extrusion is soft without being easily broken due to its appropriate strength, and thus should not flow out of a nozzle, so that the printing temperature and extrusion ability of a sample which did not comprise the drug produced under the conditions in Table 2 were confirmed, and the results are shown in the following Table 3.

TABLE 3

| Preparation Example | Printing temperature (° C.) | Extrusion ability and film-forming ability ((−) Extrusion is impossible, (+) Extrusion is unstable, and (++) Extrusion is good) |
|---|---|---|
| P1 | 100 | ++ |
| P2 | 125-130 | ++ |
| P3 | 135-140 | ++ |
| P4 | 145-150 | ++ |
| P5 | 150-155 | + |
| P6 | 155 | − |

As a result of reviewing the extrusion ability and film-forming ability through experiments, it could be confirmed that the printed mixtures from P1 to P4 among the prepared compounds had good extrusion and film-forming abilities, but the film-forming ability began to become unstable from P5, and P6 could not be extruded. Through these results, it was confirmed that the oral disintegrating film containing olanzapine could exhibit good extrusion ability and film-forming ability only when the weight proportion of Kollidon VA64 is limited to 30% or less.

Example 3. Production and Morphological Confirmation of Oral Disintegrating Film Comprising Olanzapine 3-1. Production of Oral Disintegrating Film Comprising Olanzapine Based on the results of Example 2, an oral disintegrating film comprising olanzapine (hereinafter, referred to as ODFs) was actually produced in the same manner as in Example 2, and the specific conditions of the film thus produced are shown in the following Table 4.

TABLE 4

|  | F1 | F2 | F3 | F4 |
|---|---|---|---|---|
| Olanzapine (OLZ) (% w/w) | 5 | 5 | 5 | 5 |
| Polyethylene oxide N10 (PEO) (% w/w) | 95 | 85 | 75 | 65 |
| Kollidon VA64 (PVPVA64) (% w/w) | — | 10 | 20 | 30 |
| Poloxamer 407 (P407) (% w/w) | — | — | — | — |
| Poloxamer 188 (P188) (% w/w) | — | — | — | — |
| Printing temperature (° C.) | 170 | 165 | 160 | 160 |

For the films F1 to F4 in Table 4, the printing temperature, film morphology, and forming ability of each film were evaluated. Since films including a polyethylene oxide N10 polymer alone, such as F1, do not have any Kollidon VA64 which can lower the printing temperature, it was confirmed that when the film was mixed with olanzapine, the printing temperature was increased to about 170° C. due to the influence of olanzapine, which has a high melting point, and at such a high temperature, materials loaded before printing were easily burnt, which is not suitable for the production of the film. The ratio of the two polymers was evaluated for F2 to F4 while increasing the amount of Kollidon VA64, and printing under all conditions was possible. Furthermore, as expected, as the concentration of Kollidon VA64 was increased, printing was possible at lower temperatures, but it was confirmed that the extrusion ability deteriorated because there was no difference in printing temperature between F3 and F4 and the extrudate became hard and easily broken from F4, which comprised Kollidon VA64 at 30% by weight based on the total weight of the film.

Figure 4:
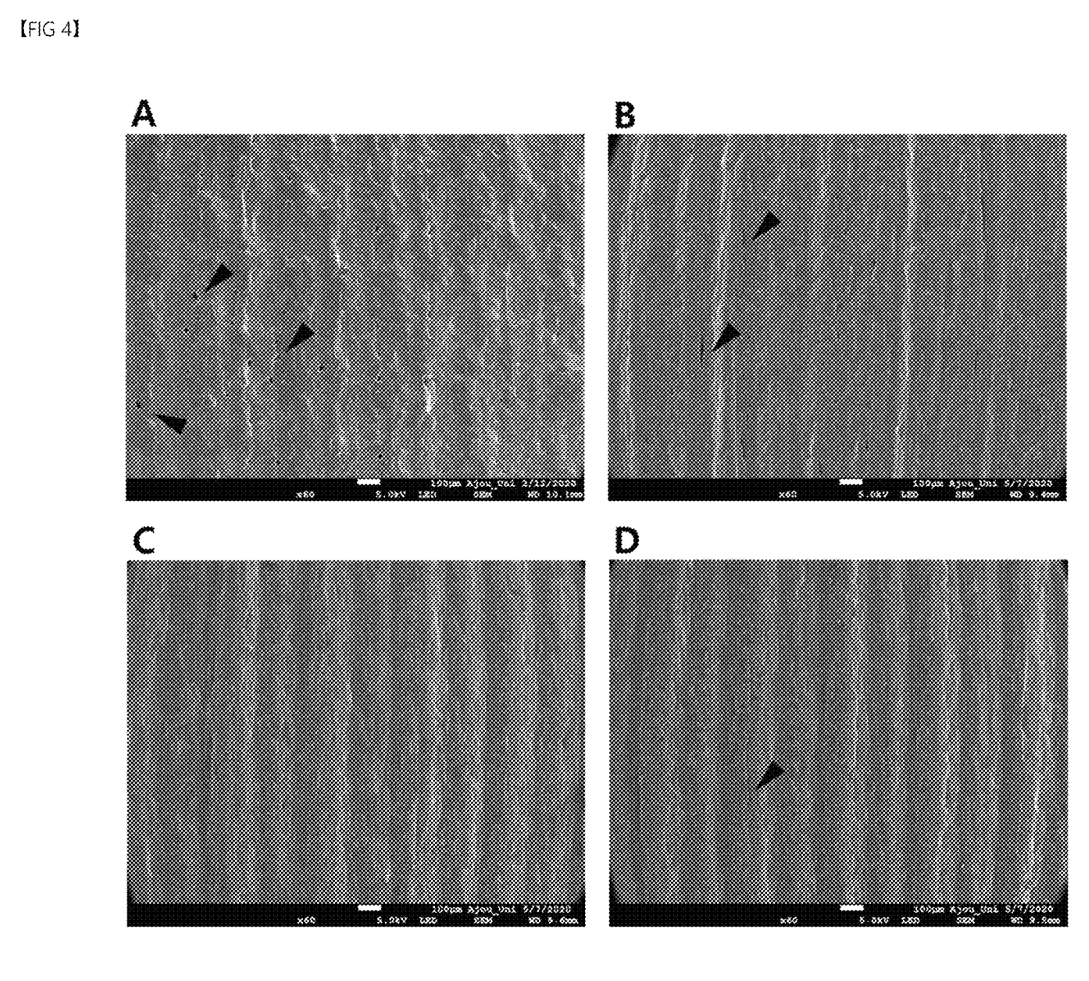
FIG. 4 illustrates results of observing the surfaces of oral disintegrating films having composition ratios of (A) F1, (B) F2, (C) F3, and (D) F4 by a scanning electron microscope (SEM)

3-2. Confirmation of Surface Characteristics of Oral Disintegrating Film Comprising Olanzapine It was expected that the morphology of the film surface was different in the films including the composition ratios of F1 to F4 in Example 3-1 because the weight ratios of the constituents were different. Therefore, in order to observe ODFs utilizing a scanning electron microscope (SEM), the surfaces of ODFs were coated with platinum under vacuum for 80 seconds, and then confirmed using field-emission scanning electron microscopy (FE-SEM) (JSM-6700F, JEOL, Akishima, Japan), and imaging was performed at various magnifications under a voltage of 5 kV. As a result, as illustrated in FIG. 4, it could be confirmed that F1 and F2 having a solubilizer (Kollidon VA64) content of less than 20% by weight had a porous portion (arrow) formed when extruded, and it was confirmed that for F4 having a solubilizer content exceeding 20% by weight, a crack (arrow) was observed in the surface of the film, thereby inhibiting the stable formation of the film.

Based on the results, it could be confirmed that limiting the solubilizer content to 20% by weight based on the weight ratio of the total film was suitable for producing the oral disintegrating film of the present disclosure.

3-3. Production of Oral Disintegrating Film Comprising Plasticizer

Based on the results of Examples 3-2 and 3-3, F5 and F6 further comprising a plasticizer were produced to search for conditions having more suitable characteristics while limiting the solubilizer (Kollidon VA64) to 20% by weight. The weight ratio, average weight, thickness (the thickness of the film was measured using a constant pressure thickness measuring instrument PG-12J (TECLOCK, Nagoya, Japan)), printing temperature, and the like of the specific constituents were compared with those of F3, and are shown in the following Table 5.

TABLE 5

|  | F3 | F5 | F6 |
|---|---|---|---|
| Olanzapine (OLZ) (% w/w) | 5 | 5 | 5 |
| Polyethylene oxide N10 (PEO) (% w/w) | 75 | 70 | 70 |
| Kollidon VA64 (PVPVA64) (% w/w) | 20 | 20 | 20 |
| Poloxamer 407 (P407) (% w/w) | — | 5 | — |
| Poloxamer 188 (P188) (% w/w) | — | — | 5 |
| Printing temperature (° C.) | 160 | 160 | 160 |
| Thickness ± standard deviation (μm) | 243.3 ± 5.7 | 242.3 ± 7.1 | 243.3 ± 11.5 |
| Average weight standard deviation (mg) | 102.9 ± 3.3 | 103.2 ± 5.5 | 102.9 ± 2.4 |

Figure 5:
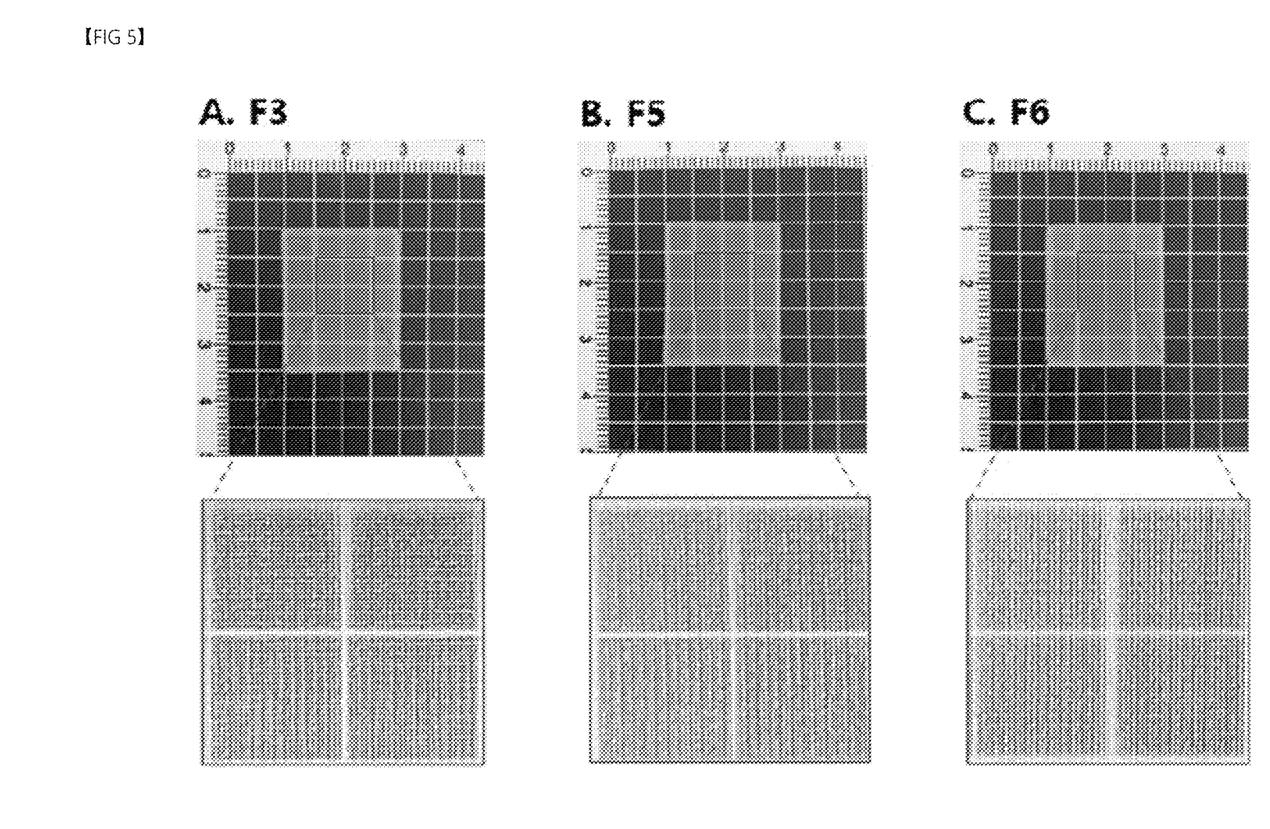
FIG. 5 illustrates results of observing the appearances of oral disintegrating films having composition ratios of (A) F3, (B) F5, and (C) F6.
Figure 6:
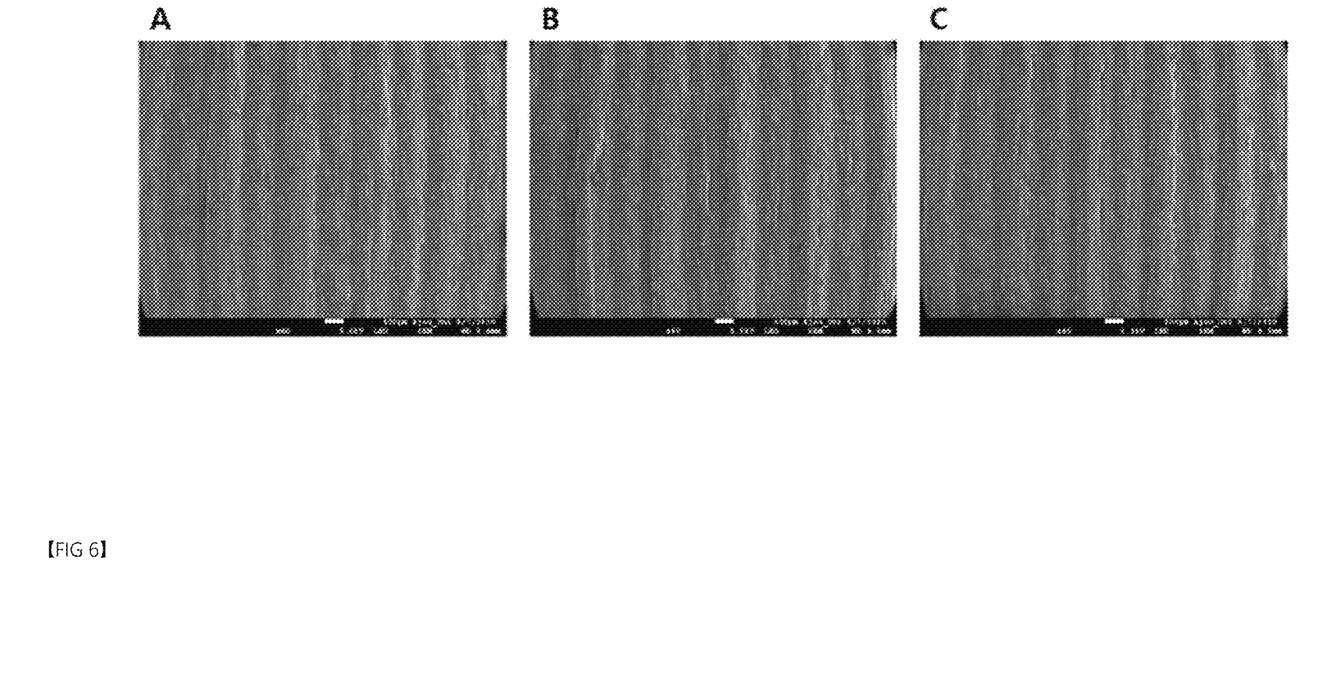
FIG. 6 illustrates results of observing the surfaces of oral disintegrating films having composition ratios of (A) F3, (B) F5, and (C) F6 by a scanning electron microscope (SEM)

F3, F5, and F6 thus produced show the same appearance as illustrated in FIG. 5, and when the surface is observed in the same manner as in Example 3-2 in order to specifically observe the surface, no porosity or cracks were found as illustrated in FIG. 6, so that it was confirmed that F3, F5, and F6 could be used as an appropriate mixture for ODFs of the present disclosure, and experiments were performed to confirm the specific characteristics of F3, F5, and F6.

Example 4. Measurement of Tensile Strength of F3, F5, and F6

Since the oral disintegrating film should have appropriate strength for handling and transportation, the tensile strengths of the films having the composition ratios of F3 suitable for the oral disintegrating film of the present disclosure established in Example 3 and F5 and F6 to which an additional plasticizer was added were measured. The tensile strength was measured using an HSKT texture analyzer (Tinius Olsen Corp., Horsham, PA, USA) with 500 N-load cells until the film was broken, and then the average was recorded, and is shown in the following Table 6.

TABLE 6

| Preparation Example | Strength ± standard deviation (N) |
|---|---|
| F3 | 14.3 ± 0.2 |
| F5 | 10.8 ± 2.7 |
| F6 | 15.6 ± 0.6 |

As a result of measuring the strength, it could be confirmed that when compared with a film having a composition ratio of F3, a film having a composition ratio of F5 further containing poloxamer 407 had a decreased tensile strength, whereas a film having a composition ratio of F6 further containing poloxamer 188 had a slightly increased tensile strength.

Example 5. Evaluation of Content Uniformity of the Active Ingredient for F3, F5, and F6

A film of each dosage form (5 cm$^2$ piece containing OLZ at 5% by weight) was put into 100 mL of a 20 mM phosphate buffer (pH 6.8) and ultrasonically treated until the film was fully dissolved (n=3), and then the solution was filtered through a 0.45 μm syringe filter. A sample was diluted in a 25-mL volumetric flask and analyzed using high performance liquid chromatography (HPLC, Waters 2695, Waters Corp., Milford, MA, USA). For the high performance liquid chromatography analysis, a 5 μm XTerra reverse phase C18 (250×4.6 mm) column (Waters Corp., Milford, MA, USA) was used along with an isocratic elution method comprising a mobile phase of 12.86 mM potassium dihydrogen phosphate buffer (pH 6)/acetonitrile (60:40 v/v). Analysis was performed three times using the above method, and the analysis results are shown in the following Table 7.

TABLE 7

| Preparation Example | Drug content uniformity ± standard deviation (%) |
|---|---|
| F3 | 98.0 ± 2.4 |
| F5 | 98.5 ± 1.5 |
| F6 | 99.6 ± 2.1 |

Through the above results, it could be confirmed that all of the ODFs met the theoretical uniformity of the drug because the drug contents of films having composition ratios of F3, F5, and F6 were exhibited to be ranging from 98.0% to 99.6%.

Example 6. Evaluation of Disintegration Time of F3, F5, and F6

A disintegration test of the film was performed using a DIT-200 disintegration apparatus (Labfine Inc., Seoul, Korea), which is a type A pharmacopeial disintegration apparatus. The film was mounted in a disintegration vessel, and a disintegration time was observed using 900 mL of deionized water as a decomposition medium in a disintegration medium at 37±0.5° C. As the disintegration time, the time when the film was disintegrated and decomposed was recorded, the disintegration time of the film was measured three times, and all times were recorded, and are shown in the following Table 8.

TABLE 8

| Preparation Example | Disintegration time ± standard deviation (seconds) |
|---|---|
| F3 | 21.7 ± 1.5 |
| F5 | 17.7 ± 1.5 |
| F6 | 17.0 ± 1.7 |

As a result of the disintegration test of the film, it was found that the disintegration time of the films having composition ratios of F5 and F6 comprising the plasticizer was faster than that of the film having a composition ratio of F3. Since disintegration time of the oral disintegrating film has no official standard guideline, it was confirmed that when the oral disintegrating film was evaluated based on the USP and Ph. Eur criteria of an oral disintegrating tablet which is brought into contact with saliva in the oral cavity, all of F3, F5, and F5 had a fast disintegration time satisfying the criteria.

Example 7. Confirmation of Solid State Characteristics of Olanzapine Active Ingredients of F3, F5, and F6

7-1 Confirmation of Solid State of Olanzapine Using Differential Scanning Calorimetry (DSC)

Figure 7:
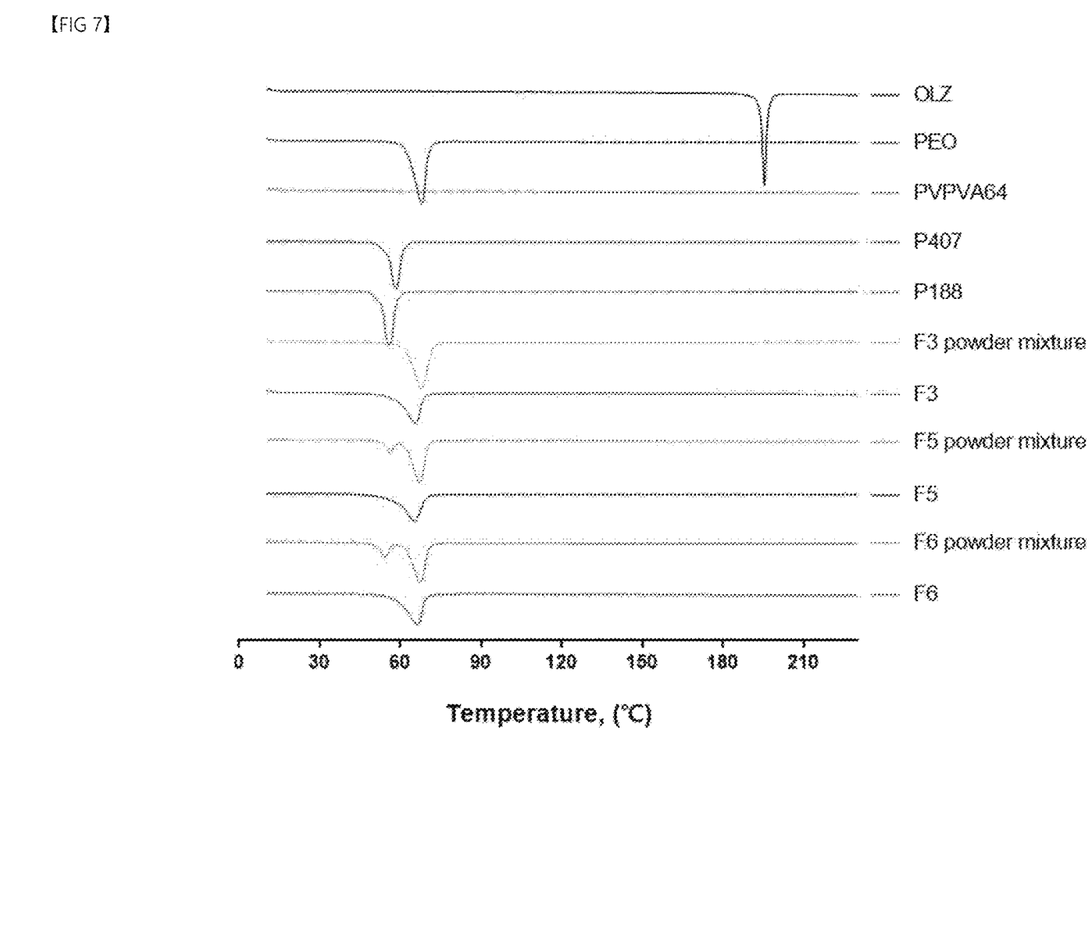
FIG. 7 illustrates results of observing polymers (olanzapine (OLZ), polyethylene oxide N10 (PEO), Kollidon VA64 (PVPVA64), poloxamer 407 (P407), and poloxamer 188 (P188)), powder mixtures in a pre-3D printing state (F3, F5, and F6 powder mixtures) and 3D printed film samples (orodispersible films, hereinafter, ODFs) (F3, F5, and F6) utilizing differential scanning calorimetry (DSC)

For differential scanning calorimetry analysis, DSC 200 F3 Maia (NETZSCH, Selb, Germany) was used, and the differential scanning calorimetry analysis was corrected using indium. Samples were prepared in an aluminum pan and analyzed in a temperature range of 5° C. to 230° C. at a rate of 10° C./min. Pure nitrogen gas was allowed to flow at a rate of 50 mL/min during all differential scanning calorimetry analyses, and melting point and transition point data were obtained from heat flow data. The morphology of olanzapine was confirmed by measuring the heat input and output of polymers (olanzapine (OLZ), polyethylene oxide N10 (PEO), Kollidon VA64 (PVPVA64), poloxamer 407 (P407), and poloxamer 188 (P188)), powder mixtures in a pre-3D printing state (F3, F5, and F6) and 3D printed film samples (ODFs of F3, F5, and F6), which are constituent elements of the mixture by the aforementioned method. As a result, as illustrated in FIG. 7, it could be confirmed that olanzapine in the form of crystal exhibited a sharp peak and showed a melting point at 195° C., and for the powder mixture in a pre-3D printing state, endothermic peaks could be confirmed around the melting points of PEO, P407, and P188, but since it was confirmed that the 3D printed sample exhibited a single smooth endothermic peak, it could be confirmed that the drug was comprised in an amorphous state.

7-2 Confirmation of Solid State of Olanzapine Through Powder X-Ray Diffuser

Figure 8A:
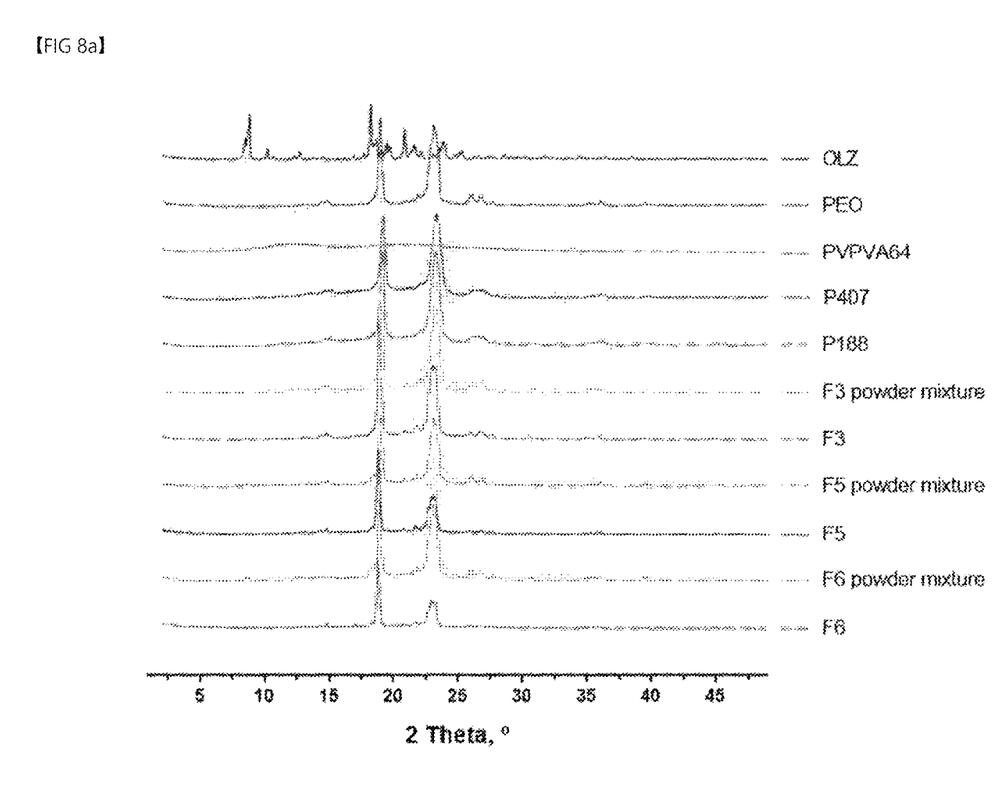
FIG. 8A illustrates results of performing powder X-ray diffraction analysis on powders (olanzapine (OLZ), polyethylene oxide N10 (PEO), Kollidon VA64 (PVPVA64), poloxamer 407 (P407), and poloxamer 188 (P188)), powder mixtures (F3, F5, and F6 powder mixtures) and 3D printed samples (F3, F5, and F6).
Figure 8B:
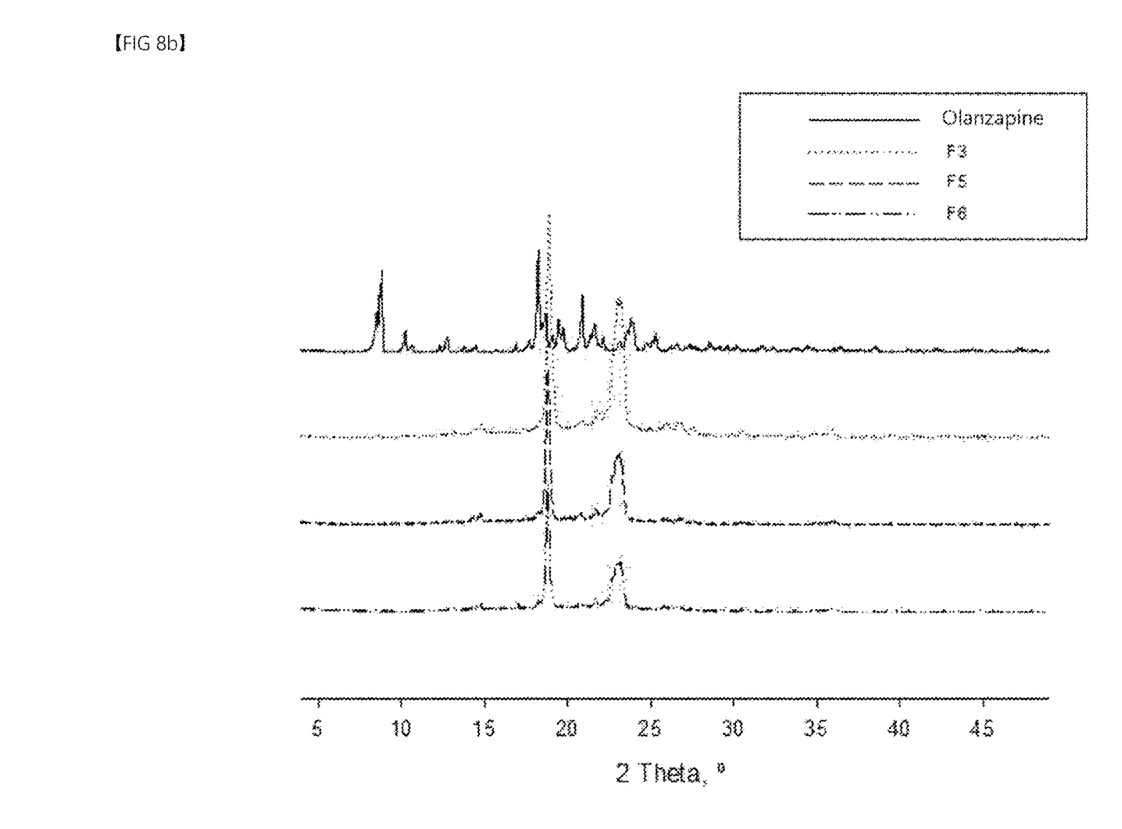
FIG. 8B illustrates powder X-ray diffraction analysis results of olanzapine and the films of the present disclosure (F3, F5, and F6)

The crystallinity of the drug was examined by performing a powder X-ray diffraction analysis method on each powder (olanzapine (OLZ), polyethylene oxide N10 (PEO), Kollidon VA64 (PVPVA64), poloxamer 407 (P407), and poloxamer 188 (P188)), the powder mixtures (F3, F5, and F6), and the 3D printed samples (ODFs of F3, F5, and F6) using a powder X-ray diffuser (D/max-2500V/PC, Rigaku, Tokyo, Japan). All samples were prepared in the form of a powder for measurement, and PXRD analysis was performed with Cu—K radiation under conditions of 40 kV and 150 mA. The sample was scanned at a rate of 1°/sec while adjusting the angle by 0.02° from 5° to 50°. The data calculated by the method is illustrated in FIG. 8A, and the peak means the crystalline morphology of a material. For a specific analysis of the crystal morphology of olanzapine comprised in F3, F5, and F6, the analysis results of only F3, F5, and F6 and olanzapine are illustrated in FIG. 8B. As a result of specifically analyzing FIGS. 8A and 8B, the crystalline morphology of olanzapine generally has characteristically sharp crystal peaks at 8.79° and 18.48°, but no characteristic crystal peak of olanzapine was observed from oral disintegrating films produced using F3, F5, and F6. From these results, it was confirmed that olanzapine was converted into an amorphous form in a 3D printing process by hot-melt pneumatic extrusion.

Through the differential scanning calorimetry analysis and powder X-ray diffusion analysis, it was confirmed that the olanzapine comprised in the oral disintegrating films produced using F3, F5, and F6 had an amorphous form.

Example 8. Confirmation of In Vitro Solubility (Dissolution) of Olanzapine Active Ingredients from F3, F5, and F6

Figure 9:
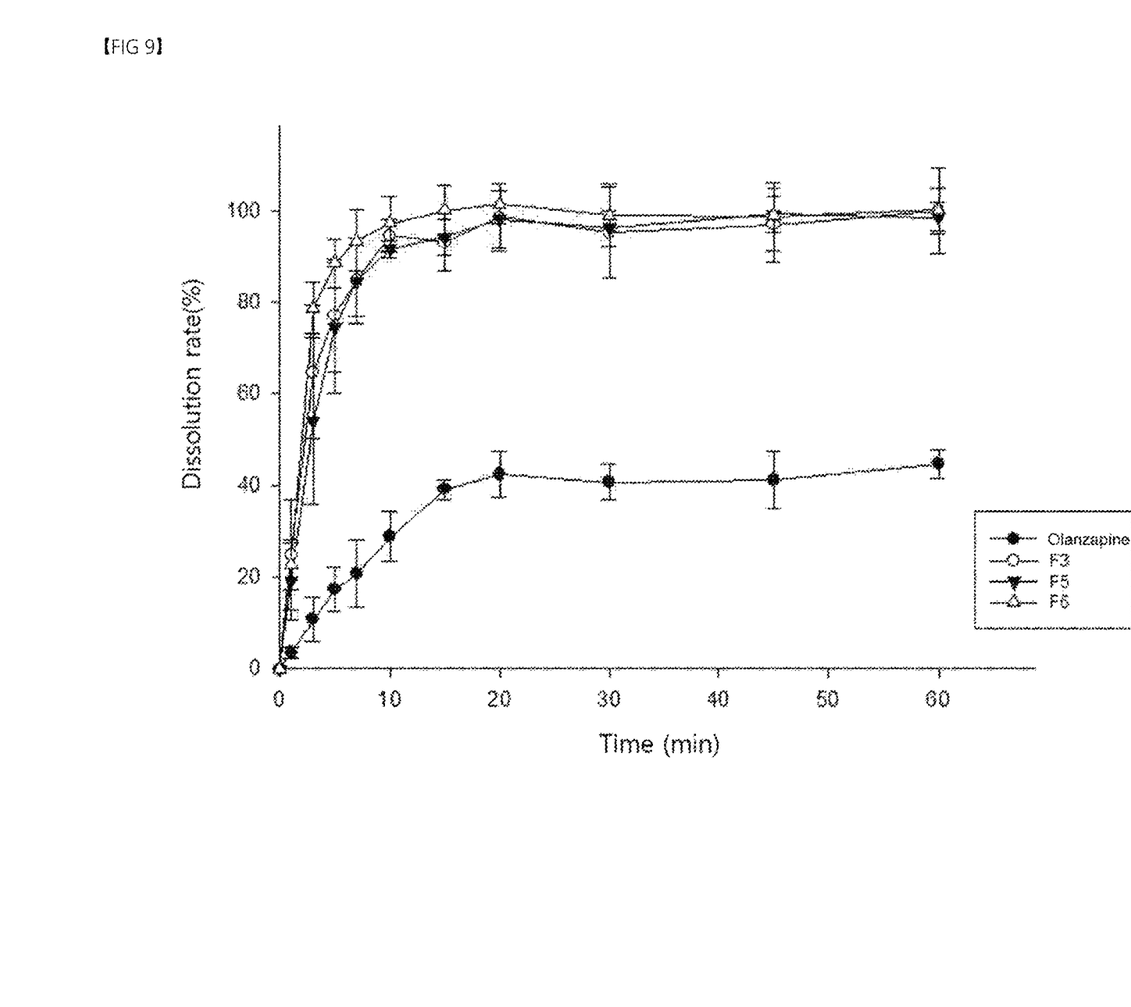
FIG. 9 illustrates results of measuring the drug solubilities of olanzapine and the films of the present disclosure (F3, F5, and F6)

An in vitro dissolution test was performed using the United States Pharmacopeia (USP) apparatus II paddle method (LOGAN Instruments Corp., Somerset, NJ, USA). For the dissolution test, a salivary medium such as potassium phosphate ($KH_2PO_4$, 12 mM), sodium chloride (NaCl, 40 mM), and calcium chloride ($CaCl_2$, 1.5 mM) whose pH was adjusted to 7.4 using sodium hydroxide (NaOH) was prepared. The test was performed at a temperature of 37±0.5° C. using 900 mL of a solution and a rotating paddle which showed 100 revolutions per minute. 5 mL of a sample solution was withdrawn from the medium at time intervals of 1, 3, 5, 7, 10, 15, 20, 30, 45, and 60 minutes and filtered through a syringe filter (0.45 pin). The filtrate was repeatedly analyzed 3 times using HPLC under the aforementioned conditions. As a result, as illustrated in FIG. 9, it could be confirmed that F3 and F5 showed a similar dissolution pattern because the drug release amount of F3 and F5 was shown to be 84.7% and 84.6%, respectively, at 7 minutes, and F6 showed the fastest drug release pattern by releasing 88.5% of the drug in 5 minutes. Since the drug release times of these F3, F5 and F6 met the dissolution criteria of an immediate release preparation, it was confirmed that F3, F5, and F6 could be usefully used when produced as ODFs.

Example 9. Solubility Confirmation Experiment for Poorly Soluble Drugs Other than Olanzapine As a result of Examples 4 to 8, it was confirmed that films having composition ratios such as F3, F5 and F6 were suitable for producing an oral disintegrating film having high solubility of poorly soluble drugs, and since excellent solubility was shown even when a poorly soluble drug other than olanzapine was comprised while maintaining the constituent ingredients of F6 among them, F7, F8, and F9, which are oral disintegrating films including the compositions shown in the following Table 9, comprising haloperidol, glibenclamide or indapamide as a constituent ingredient were produced in order to confirm whether the film could be used as an oral disintegrating film.

TABLE 9

| Ingredient | F6 | F7 | F8 | F9 |
|---|---|---|---|---|
| Olanzapine (% w/w) | 5 | — | — | — |
| Haloperidol (% w/w) | — | 5 | — | — |
| Glibenclamide (% w/w) | — | — | 5 | — |
| Indapamide (% w/w) | — | — | — | 5 |
| Polyethylene oxide N10 (% w/w) | 70 | 70 | 70 | 70 |
| Kollidon VA64 (% w/w) | 20 | 20 | 20 | 20 |
| Poloxamer 188 (% w/w) | 5 | 5 | 5 | 5 |

Figure 10:
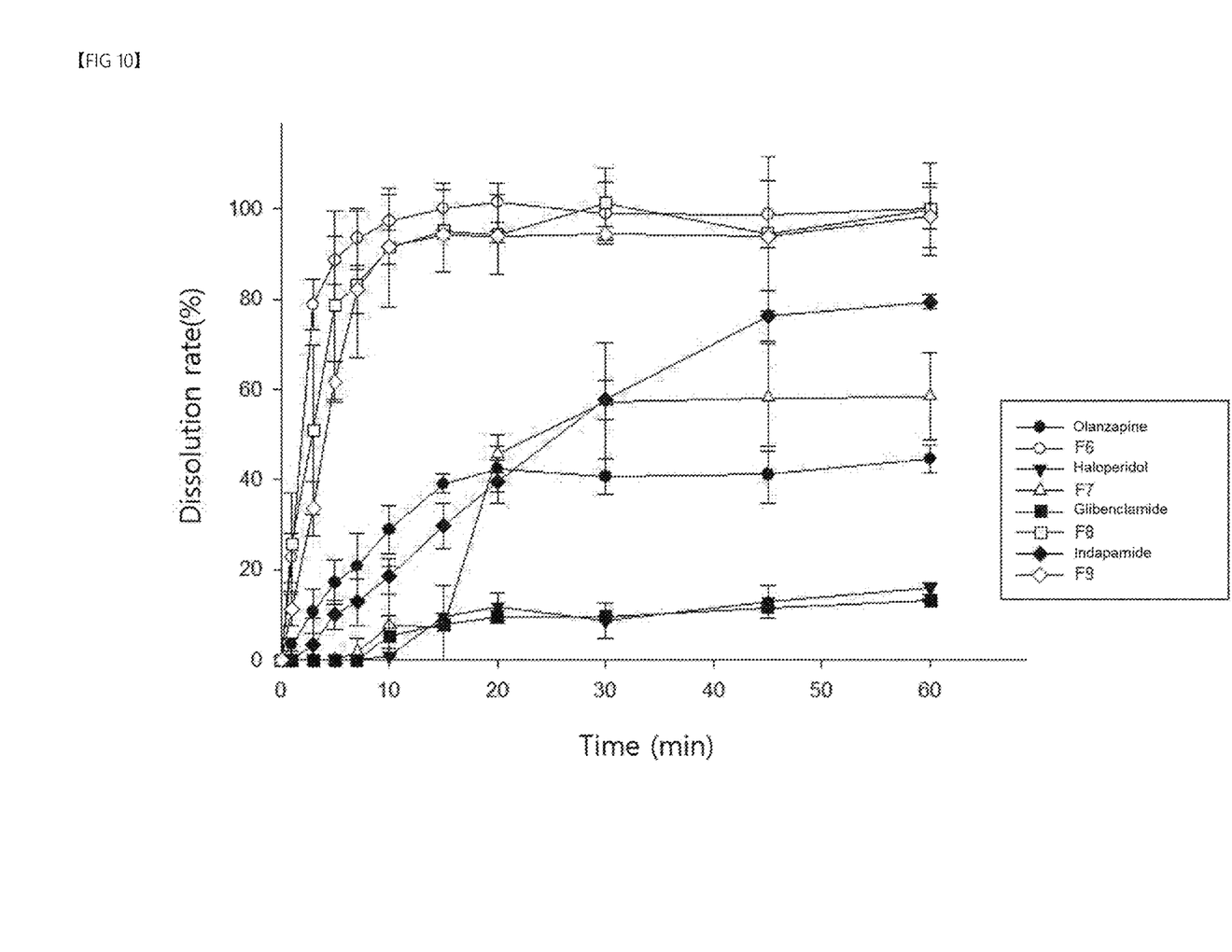
FIG. 10 illustrates results of measuring the drug solubilities of the film of the present disclosure (F6 to F9) and a poorly soluble drug comprised in the corresponding film.

The solubility of F6, F7, F8 and F9 having the aforementioned compositions was tested in the same manner as in Example 8. As a result, as illustrated in the following FIG. 10, all of F7 to F9 produced in the form of an oral disintegrating film by the production method of the present disclosure showed an increased dissolution pattern compared to the poorly soluble drug in a state of not being produced in the form of a film. In the case of F6, it could be reconfirmed that the drug release reached 88.5% in 5 minutes as before, and F7 had an increased dissolution rate compared to free haloperidol, and showed a dissolution pattern reaching 57.4% in 30 minutes and 58.5% in 1 hour. It was confirmed that F8 had a higher dissolution rate than free glibenclamide and 83.17% of the drug was released in 7 minutes, and it could be confirmed that F9 had a higher dissolution rate than free indapamide and the drug release reached 82.15% in 7 minutes. Since these results of F7 to F9 show higher release efficiencies than the release efficiency of a free poorly soluble drug even when the oral disintegrating film of the present disclosure is produced using poorly soluble drugs other than olanzapine (haloperidol, glibenclamide, and indapamide) and satisfy the dissolution criteria of an immediate release preparation. It was confirmed that the oral disintegrating film of the present disclosure could be usefully used in the oral drug administration.

Based on the results, it was confirmed that the production method of the present disclosure could be universally utilized for poorly soluble drugs by confirming that when an oral disintegrating film was produced using the production method of the present disclosure, the solubility thereof was significantly increased not only in the case of olanzapine, but also in the case of other poorly soluble drugs.

For an oral disintegrating film comprising olanzapine according to the present disclosure, the film can be stably produced by a simpler process using a 3D printing technology which utilizes a hot-melt pneumatic extrusion method to simplify the production process, and a drug of a film produced by this method is present in the form of an amorphous solid dispersion, and thus has advantages such as an increase in solubility, reduction in costs, and ease of scale-up, so that the drug can be usefully used for the related treatment fields such as mental health disorders, etc., that the patient's medication convenience and medication compliance have an important effect on treatment.

However, the effects of the present disclosure are not limited to the aforementioned effects and should be understood to include all possible effects deduced from the configuration of the invention described in the detailed description or the claims of the present disclosure.

The above-described description of the present disclosure is provided for illustrative purposes, and those skilled in the art to which the present disclosure pertains will understand that the present disclosure can be easily modified into other specific forms without changing the technical spirit or essential features of the present disclosure. Therefore, it should be understood that the above-described embodiments are only exemplary in all aspects and are not restrictive.

What is claimed is:

1. A method for producing an oral disintegrating film comprising a poorly soluble drug, the method comprising the following steps:
    a) producing a mixture by melting a film-forming polymer, a solubilizer, a plasticizer, and a poorly soluble drug; and
    b) printing the melted mixture by a 3D printing technique, wherein the film-forming polymer is polyethylene oxide, wherein the solubilizer is a vinylpyrrolidone-vinyl acetate copolymer, wherein the plasticizer is poloxamer 407 or poloxamer 188, wherein the poorly soluble drug is one or more Biopharmaceutic Classification System Class II drugs selected from the group consisting of olanzapine, haloperidol, glibenclamide, and indapamide, and wherein printing is performed by spraying at a pneumatic pressure of 450 kPa to 500 kPa.

2. The method of claim 1, wherein the printing is performed at a temperature of 150° C. to 170° C.

3. The method of claim 1, wherein the solubilizer is comprised in an amount of 20 wt %.

4. The method of claim 1, wherein the plasticizer is comprised in an amount of 5 wt %.

5. The method of claim 1, wherein the oral disintegrating film comprises the poorly soluble drug in the form of an amorphous solid dispersion.

6. The method of claim 1, wherein the poorly soluble drug is olanzapine.

7. An oral disintegrating film produced by the method of claim 1.

8. The oral disintegrating film of claim 7, wherein the oral disintegrating film has a tensile strength of 13 N to 18 N.

9. The oral disintegrating film of claim 7, wherein the oral disintegrating film has a drug content uniformity of 94% to 100%.

10. The oral disintegrating film of claim 7, wherein the oral disintegrating film has a disintegration time of 14 seconds to 24 seconds.

11. The oral disintegrating film of claim 7, wherein the oral disintegrating film comprises the poorly soluble drug in the form of an amorphous solid dispersion.

* * * * *